United States Patent
Lodge, Jr.

(10) Patent No.: US 9,423,547 B1
(45) Date of Patent: Aug. 23, 2016

(54) OPTICAL FIBER LIGHT APPARATUS, AND BALLOON APPARATUS PROVIDED WITH SUCH OPTICAL FIBER LIGHT APPARATUS

(71) Applicant: Independent Paradigm, LLC, Medford, NJ (US)

(72) Inventor: Thomas R. Lodge, Jr., Philadelphia, PA (US)

(73) Assignee: Independent Paradigm, LLC, Medford, NJ (US)

( * ) Notice: Subject to any disclaimer, the term of this patent is extended or adjusted under 35 U.S.C. 154(b) by 121 days.

(21) Appl. No.: 13/915,358

(22) Filed: Jun. 11, 2013

(51) Int. Cl.
*G02B 6/02* (2006.01)
*F21V 8/00* (2006.01)

(52) U.S. Cl.
CPC ........... *G02B 6/0005* (2013.01); *F21V 2200/15* (2015.01)

(58) Field of Classification Search
CPC .... G02B 6/0005; G02B 6/0006; G02B 6/001; F21W 2121/06; F21V 2200/10; F21V 2200/15; F21V 2200/30; A63H 2027/1058; A63H 27/10
See application file for complete search history.

(56) References Cited

U.S. PATENT DOCUMENTS

| | | | |
|---|---|---|---|
| 4,791,745 A | 12/1988 | Pohn | |
| 4,924,612 A * | 5/1990 | Kopelman | G09F 9/305 362/559 |
| 5,129,032 A | 7/1992 | Kawai et al. | |
| 5,617,497 A * | 4/1997 | Kingstone | B29C 47/0016 385/100 |
| 5,857,760 A * | 1/1999 | Pelton | F21V 3/023 244/33 |
| 6,106,135 A | 8/2000 | Zingale et al. | |
| 6,371,638 B1 | 4/2002 | Zingale et al. | |
| 6,404,973 B1 | 6/2002 | Lee | |
| 6,882,117 B1 | 4/2005 | Hughes et al. | |
| 6,918,692 B2 | 7/2005 | Yang | |
| 7,073,932 B2 | 7/2006 | Wainwright | |
| 7,186,011 B2 | 3/2007 | Lee | |
| 7,500,776 B1 | 3/2009 | Buczko | |
| 7,503,681 B2 | 3/2009 | Kemp et al. | |
| 2004/0233674 A1 * | 11/2004 | Vanderschuit | A63H 27/10 362/352 |
| 2005/0024893 A1 | 2/2005 | Wainwright | |
| 2006/0291217 A1 * | 12/2006 | Vanderschuit | A63H 27/10 362/363 |
| 2007/0049158 A1 * | 3/2007 | Chou | A63H 27/10 446/220 |
| 2008/0074897 A1 | 3/2008 | Kemp et al. | |
| 2009/0161359 A1 | 6/2009 | Siemiet et al. | |
| 2010/0066254 A1 * | 3/2010 | Ott | G02B 6/0003 315/129 |
| 2010/0197193 A1 | 8/2010 | Kemp et al. | |
| 2012/0275180 A1 * | 11/2012 | Button | G02B 6/001 362/558 |

OTHER PUBLICATIONS

International Search Report (copy enclosed) and Written Opinion (copy enclosed) of the International Searching Authority in PCT International Application No. PCT/US2014/041744.

* cited by examiner

*Primary Examiner* — Julie Bannan
(74) *Attorney, Agent, or Firm* — John F. A. Earley, III; Frank J. Bonini, Jr.; Harding, Earley, Follmer & Frailey, P.C.

(57) ABSTRACT

Balloons, including lighter than air balloons and heavier than air balloons, are provided with optical fiber light apparatuses, in which the optical fiber light apparatuses have at least one optical fiber and at least one fluorescent color applied to the at least one optical fiber, such that black light moving through the at least one optical fiber produces fluorescent colored light as the black light is emitted through the fluorescent color applied to the at least one optical fiber.

17 Claims, 11 Drawing Sheets

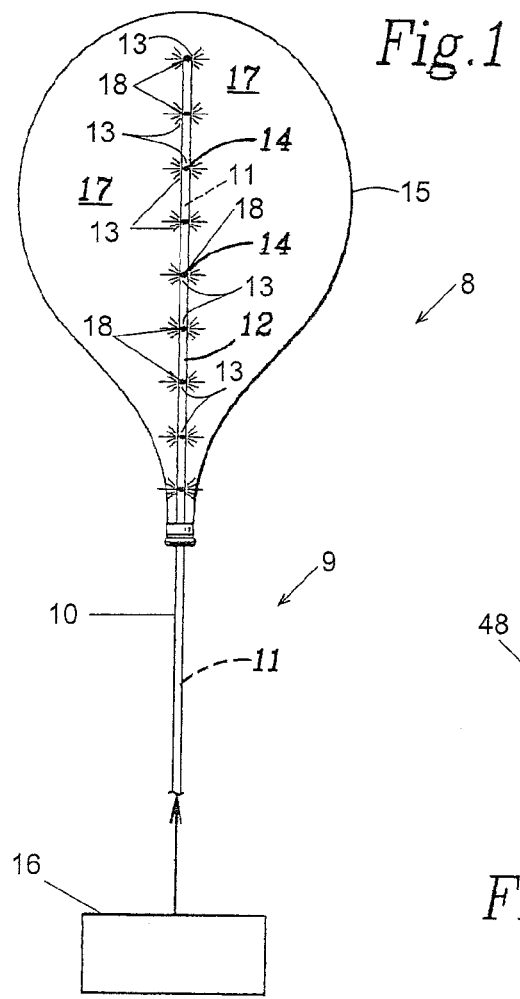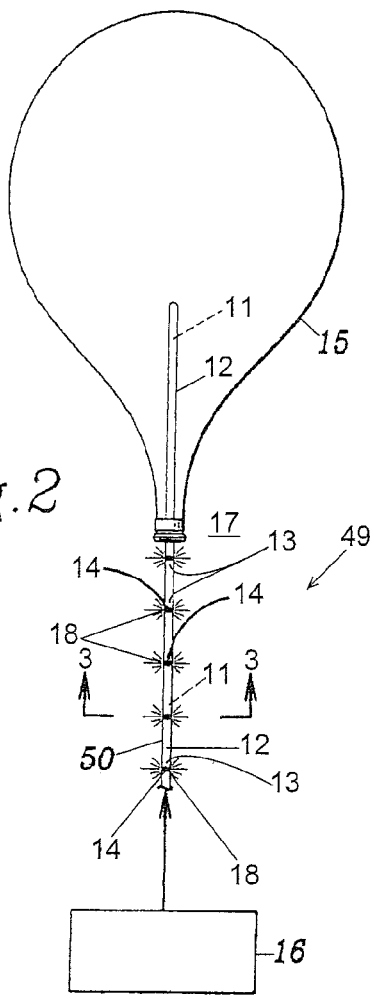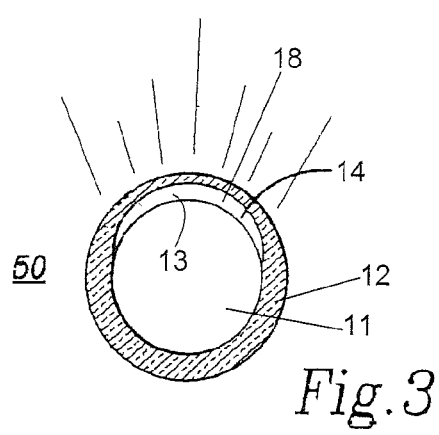

OPTICAL FIBER LIGHT APPARATUS, AND BALLOON APPARATUS PROVIDED WITH SUCH OPTICAL FIBER LIGHT APPARATUS

BACKGROUND OF THE INVENTION

1. Field of the Invention

This invention relates to optical fiber light apparatuses, and to balloons, including lighter than air balloons and heavier than air balloons, provided with optical fiber light apparatuses, and more particularly concerns optical fiber light apparatuses, and balloons, including lighter than air balloons and heavier than air balloons, provided with optical fiber light apparatuses, in which the optical fiber light apparatuses have at least one optical fiber and at least one fluorescent color applied to the at least one optical fiber, such that black light moving through the at least one optical fiber produces fluorescent colored light as the black light is emitted through the fluorescent color applied to the at least one optical fiber.

2. Description of the Prior Art

Optical fibers are well known and used for transmitting light from a light source to the desired illumination point.

U.S. Pat. Nos. 6,371,638, 5,857,760, 6,106,135, and 7,503,681, all of which are incorporated herein by reference, and U.S. patent application Ser. No. 12/322,305 (U.S. Patent Application Publication No. US 2010/0197192), which also is incorporated herein by reference, disclose various balloons illuminated by optical fiber.

SUMMARY OF THE INVENTION

An object of the invention is to provide optical fiber light apparatuses, and balloons, including lighter than air balloons and heavier than air balloons, provided with optical fiber light apparatuses, in which the optical fiber light apparatuses have at least one optical fiber and at least one fluorescent color applied to the at least one optical fiber, such that black light moving through the at least one optical fiber produces fluorescent colored light as the black light is emitted through the fluorescent color applied to the at least one optical fiber.

This object and other objects are accomplished by our invention, which is described below.

In one preferred embodiment of the invention, the inventive balloon apparatus has a balloon, a tether including at least one optical fiber, an outer jacket or cladding surrounding each optical fiber to prevent black light from escaping from the at least one optical fiber past the outer jacket or cladding, portions removed from the outer jacket or cladding at selected locations creating openings in the outer jacket or cladding that act as "light leaks" from the at least one optical fiber (which acts as a "light pipe" transmitting black light from a UV light source between the two ends of the at least one optical fiber), and a transparent coating of at least one fluorescent color applied to the at least one optical fiber at the openings ("light leaks") in the outer jacket or cladding. Preferably, a UV light source is provided to provide black light to the at least one optical fiber.

In another preferred embodiment, the inventive balloon apparatus has at least one optical fiber which has been solution dyed with at least one fluorescent color.

In another preferred embodiment, the inventive balloon apparatus has at least one optical fiber having a portion which has been etched or abraided, wherein the at least one optical fiber has at least one fluorescent color applied at the etched or abraided portion.

In another preferred embodiment of the invention, the inventive optical fiber light apparatus has at least one optical fiber, an outer jacket or cladding surrounding each optical fiber to prevent black light from escaping from the at least one optical fiber past the outer jacket or cladding, portions removed from the outer jacket or cladding at selected locations creating openings in the jacket or cladding that act as "light leaks" from the at least one optical fiber (which acts as a "light pipe" transmitting black light from a UV light source between the two ends of the at least one optical fiber), and a transparent coating of at least one fluorescent color applied to the at least one optical fiber at the openings ("light leaks") in the outer jacket or cladding. Preferably, a UV light source is provided to provide black light to the at least one optical fiber.

In another preferred embodiment, the inventive optical fiber light apparatus has at least one optical fiber which has been solution dyed with at least one fluorescent color.

In still another preferred embodiment, the inventive optical fiber light apparatus has at least one optical fiber having a portion which has been etched and or abraided, wherein the at least one optical fiber has at least one fluorescent color applied at the etched or abraided portion.

DESCRIPTION OF THE DRAWINGS

The nature and characteristic features of the invention are more readily understood from the following description taken in connection with the accompanying drawings forming part hereof in which:

FIG. 1 is a side elevational view of an optical fiber light apparatus, constructed in accordance with the invention, connected to a lighter than air balloon forming a balloon apparatus constructed in accordance with the invention;

FIG. 2 is a side elevational view of an optical fiber light apparatus, constructed in accordance with the invention, connected to a lighter than air balloon forming a balloon apparatus constructed in accordance with the invention;

FIG. 3 is a horizontal sectional view taken approximately on the lines and arrows 3-3 of FIG. 2;

Figure 4:
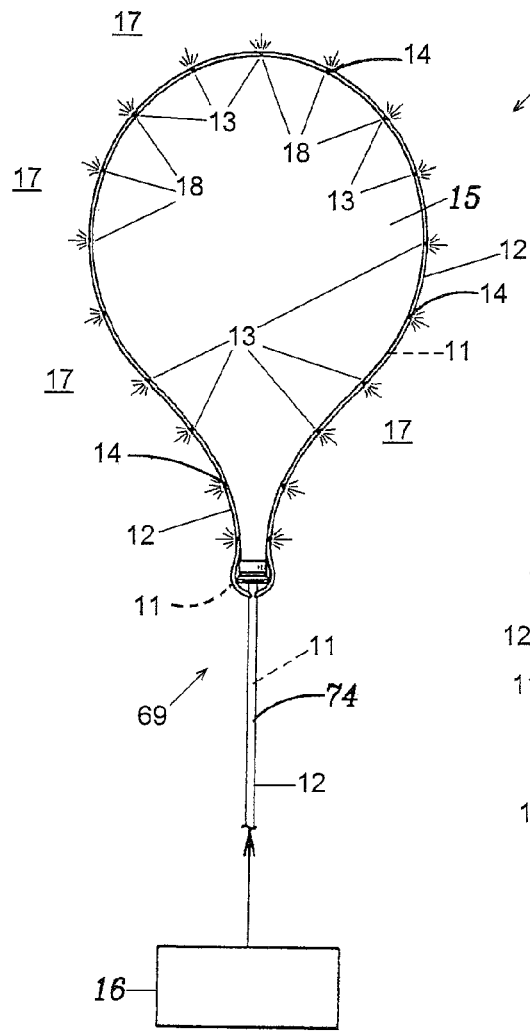
FIG. 4 is a side elevational view of an optical fiber light apparatus, constructed in accordance with the invention, connected to a lighter than air balloon forming a balloon apparatus constructed in accordance with the invention.

It should, of course, be understood that the description and drawings herein are merely illustrative, and that various modifications and changes may be made in the structures disclosed without departing from the spirit of the invention.

Like numerals refer to like parts throughout the several views.

DETAILED DESCRIPTION OF THE PREFERRED EMBODIMENTS

When referring to the preferred embodiments, certain terminology is utilized for the sake of clarity. Use of such terminology is intended to encompass not only the described embodiments, but also technical equivalents, which operate and function in substantially the same way to bring about the same result.

Turning first to FIG. 1 there is shown an inventive balloon apparatus 8, which includes as a part thereof an inventive optical fiber light apparatus 9. The balloon apparatus 8 has a tether 10, which tether 10 is comprised of one or more lengths of optical fibers 11 of well-known type, one being shown, which are readily available from a variety of manufacturers, and which tether 10 may also include a string (not shown). The fiber(s) 11 preferably has/have an outer protective jacket or cladding 12 along its/their length, to block black light transmitted along the fiber(s) 11 from being transmitted outwardly beyond where the jacket or cladding 12 is located. The jacket or cladding 12 allows minimal incidental escape of black light transmitted therein. In the embodiment of the invention shown in FIG. 1, portions of the outer jacket or cladding 12 are removed at selected locations 14 along its length creating openings 18 in the jacket or cladding 12 that act as "light leaks" from the fiber 11 (which acts as a "light pipe" transmitting black light from a UV (ultra-violet) light source 16 between the two ends of the fiber 11) to permit light to be emitted therefrom. (Alternatively, rather than removing portions of the outer jacket or cladding 12 at selected locations 14 along its length to create openings 18 that act as "light leaks" from the fiber 11 to permit light to be emitted therefrom, cladding 12 may be applied to the fiber 11 except at selected locations 14 along the fiber 11, such that black light is prevented from escaping from the fiber 11 where the cladding 12 is applied to the fiber 11, and such that black light may escape from the fiber 11 where cladding 12 is not applied. The locations 14 along the fiber 11 where the cladding 12 is not applied act as openings 18 from which black light may be emitted from the fiber 11 past the cladding 12.) A transparent or translucent coating 13 of a least one fluorescent color is applied to the fiber 11 at the openings 18 (at the "light leaks") in the outer jacket or cladding 12. Examples of such fluorescent color coatings 13 include inks, paints, dyestuffs (applied by sublimation printing), or other colorants applied to the surface of the optical fiber 11 either as a uniform "flood coat" or in patterns of single or multiple colors. The openings 18 at locations 14 may be configured to provide a variety of patterns 17, such as stars, circles, squares or any other desired pattern (not shown). Also, the optical fiber 11 may be etched or abraided at the openings 18 and covered with the transparent or translucent coating 13 of at least one fluorescent color to provide colored fluorescent light from the openings 18 in patterns determined by the etching or abrasions made on the optical fiber 11.

The tether 10 is connected to a lighter than air balloon 15, of well-known type and which can be of Mylar or other material, and can be transparent or translucent. The balloon 15 as illustrated, has been filled with a lighter than air gas, such as helium. In the embodiment of FIG. 1, the light emitting locations 14 of the fiber 11 are inside the balloon 15, and the jacket or cladding 12 allows only minimal incidental black light to escape from the fiber 11 up to the balloon 15. The fiber 11 has a UV (ultra-violet) light source 16 of well-known type connected thereto, which shines black light into the end of fiber 11, resulting in black light being emitted from the openings 18 in the jacket or cladding 12 at the selected locations 14 and through the at least one transparent fluorescent color coating 13 applied to the fiber 11 at the openings 18 (at the "light leaks") in the jacket or cladding 12, producing the emission of colored fluorescent light in the selected patterns 17 at the selected locations 14 along the fiber 11 inside the balloon 15.

Referring now to FIGS. 2 and 3, there is shown another embodiment of the inventive balloon apparatus (designated in FIGS. 2 and 3 with the reference number 48), which includes as part thereof another embodiment of the inventive optical fiber light apparatus (designated in FIGS. 2 and 3 with the reference number 49). The inventive balloon apparatus 48 has a tether 50, which tether 50 is comprised of one or more lengths of optical fibers 11 and which tether 50 may also include a string (not shown). The fiber(s) 11 preferably has/have an outer protective jacket or cladding 12 along its/their length, to block black light transmitted along the fiber(s) 11 from being transmitted outwardly beyond where the jacket or cladding 12 is located. The jacket or cladding 12 allows minimal incidental escape of black light transmitted therein. In the embodiment of the invention shown in FIGS. 2 and 3, portions of the outer jacket or cladding 12 are removed at selected locations 14 along its length creating openings 18 in the jacket or cladding 12 that act as "light leaks" from the fiber 11 (which acts as a "light pipe" transmitting black light from a UV (ultra-violet) light source 16 between the two ends of the fiber 11) to permit light to be emitted therefrom. (Alternatively, rather than removing portions of the outer jacket or cladding 12 at selected locations 14 along its length to create openings 18 that act as "light leaks" from the fiber 11 to permit light to be emitted therefrom, cladding 12 may be applied to the fiber 11 except at selected locations 14 along the fiber 11, such that black light is prevented from escaping from the fiber 11 where the cladding 12 is applied to the fiber 11, and such that black light may escape from the fiber 11 where cladding 12 is not applied. The locations 14 along the fiber 11 where the cladding 12 is not applied act as openings 18 from which black light may be emitted from the fiber 11 past the cladding 12.) A transparent or translucent coating 13 of a least one fluorescent color is applied to the fiber 11 at the openings 18 (at the "light leaks") in the outer jacket or cladding 12. The openings 18 at locations 14 may be configured to provide a variety of patterns 17, such as stars, circles, squares or any other desired pattern (not shown). Also, the optical fiber 11 may be etched or abraided at the openings 18 and covered with the transparent coating 13 of at least one fluorescent color to provide colored fluorescent light from the openings 18 in patterns determined by the etching or abrasions made on the optical fiber 11.

The tether 50 is connected to a lighter than air balloon 15, of well-known type and which can be of Mylar or other material, and may be opaque. The balloon 15 as illustrated, has been filled with a lighter than air gas, such as helium. In the embodiment of FIGS. 2 and 3, the light emitting locations 14 of the fiber 11 are outside the balloon 15, and the jacket or cladding 12 allows only minimal incidental black light to escape from the fiber 11 up to the balloon 15 except at the openings 18. The fiber 11 has a UV (ultra-violet) light source 16 of well-known type connected thereto, which shines black light into the end of fiber 11, resulting in black light being emitted from the openings 18 in the jacket or cladding 12 at the selected locations 14 and through the at least one transparent or translucent fluorescent color coating 13 applied to the fiber 11 at the openings 18 (at the "light leaks") in the jacket or cladding 12, producing the emission of colored fluorescent light in the selected patterns 17 at the selected locations 14 along the fiber 11 inside the balloon 15.

Referring now to FIG. 4, there is shown another embodiment of the inventive balloon apparatus (designated in FIG. 4 with the reference number 68), which includes as part thereof another embodiment of the inventive optical fiber light apparatus (designed in FIG. 4 with reference number 69). The inventive balloon apparatus 68 has a balloon 15, with a tether 74, which has at least one optical fiber 11 which is engaged with the balloon's perimeter. The fiber 11 has an outer jacket or cladding 12, with portions removed at locations 14 along its length. (Alternatively, rather than removing portions of the outer jacket or cladding 12 at selected locations 14 along its length to create openings 18 that act as "light leaks" from the fiber 11 to permit light to be emitted therefrom, cladding 12 may be applied to the fiber 11 except at selected locations 14 along the fiber 11, such that black light is prevented from escaping from the fiber 11 where the cladding 12 is applied to the fiber 11, and such that black light may escape from the fiber 11 where cladding 12 is not applied. The locations 14 along the fiber 11 where the cladding 12 is not applied act as openings 18 from which black light may be emitted from the fiber 11 past the cladding 12.) As with the embodiments shown in FIGS. 1 to 3, a transparent or translucent coating 13 of at least one fluorescent color is applied to the fiber 11 at the openings 18 (at the "light leaks") in the outer jacket or cladding 12. A UV (ultra-violet) light source 16 preferably is provided to shine black light into the end of fiber 11, providing the emission of colored fluorescent light from the "light leaks" in light patterns 17, at the selected locations 14. Also, the optical fiber 11 may be etched or abraided at the openings 18 and covered with the transparent or translucent coating 13 of at least one fluorescent color to provide colored fluorescent light from the openings 18 in patterns determined by the etching or abrasions made on the optical fiber 11.

Figure 5:
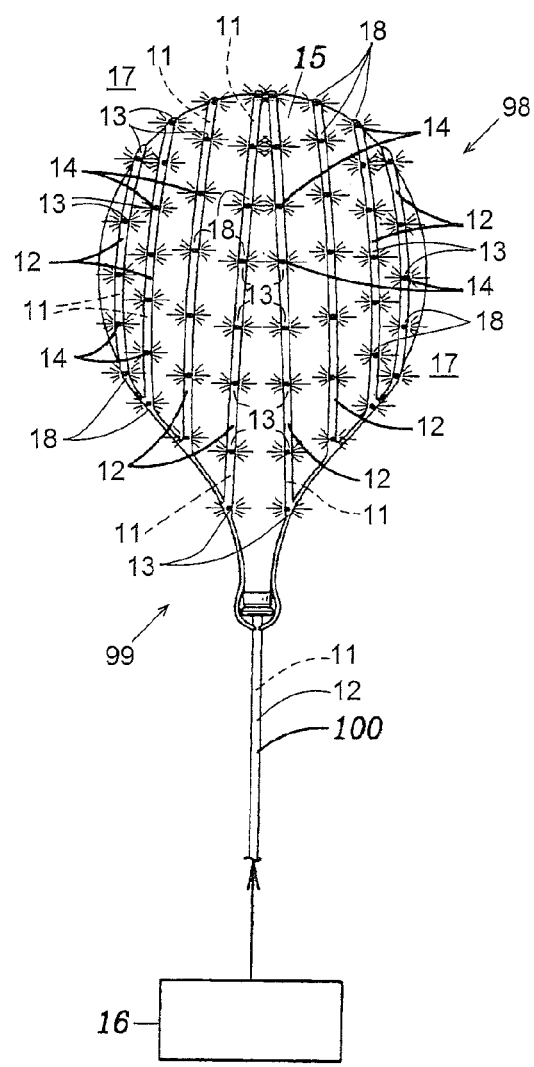
FIG. 5 is a side elevational view of an optical fiber light apparatus, constructed in accordance with the invention, connected to a lighter than air balloon forming a balloon apparatus constructed in accordance with the invention.

Referring now to FIG. 5, there is shown another embodiment of the inventive balloon apparatus (designated in FIG. 5 with the reference number 98), which includes as part thereof another embodiment of the inventive optical fiber light apparatus (designated in FIG. 5 with reference number 99). The inventive balloon apparatus 98 has a balloon 15, with a tether 100, which includes a plurality of lengths of optical fibers 11, having outer jackets or cladding 12, which allow only minimal light to escape, with portions removed at selected locations 14 along their lengths to create openings 18 in the outer jacket or cladding 12, to provide light patterns 17 to be emitted therefrom at selected locations 14. (Alternatively, rather than removing portions of the outer jacket or cladding 12 at selected locations 14 along its length to create openings 18 that act as "light leaks" from the fiber 11 to permit light to be emitted therefrom, cladding 12 may be applied to the fiber 11 except at selected locations 14 along the fiber 11, such that black light is prevented from escaping from the fiber 11 where the cladding 12 is applied to the fiber 11, and such that black light may escape from the fiber 11 where cladding 12 is not applied. The locations 14 along the fiber 11 where the cladding 12 is not applied act as openings 18 from which black light may be emitted from the fiber 11 past the cladding 12.) The fibers 11 surround and encapsulate the balloon 15. As with the embodiments shown in FIGS. 1 to 4, a transparent or translucent coating 13 of at least one fluorescent color is applied to the fiber 11 at the openings 18 (at the "light leaks") in the outer jacket or cladding 12. The fibers 11 preferably have a UV (ultra-violet) light source 16 shining black light into their ends, providing the emission of colored fluorescent light from the "light leaks" in the desired light patterns 17 at the selected locations 14. Also, the optical fiber 11 may be etched or abraided at the openings 18 and covered with the transparent or translucent coating 13 of at least one fluorescent color to provide colored fluorescent light from the openings 18 in patterns determined by the etching or abrasions made on the optical fiber 11.

Figure 6:
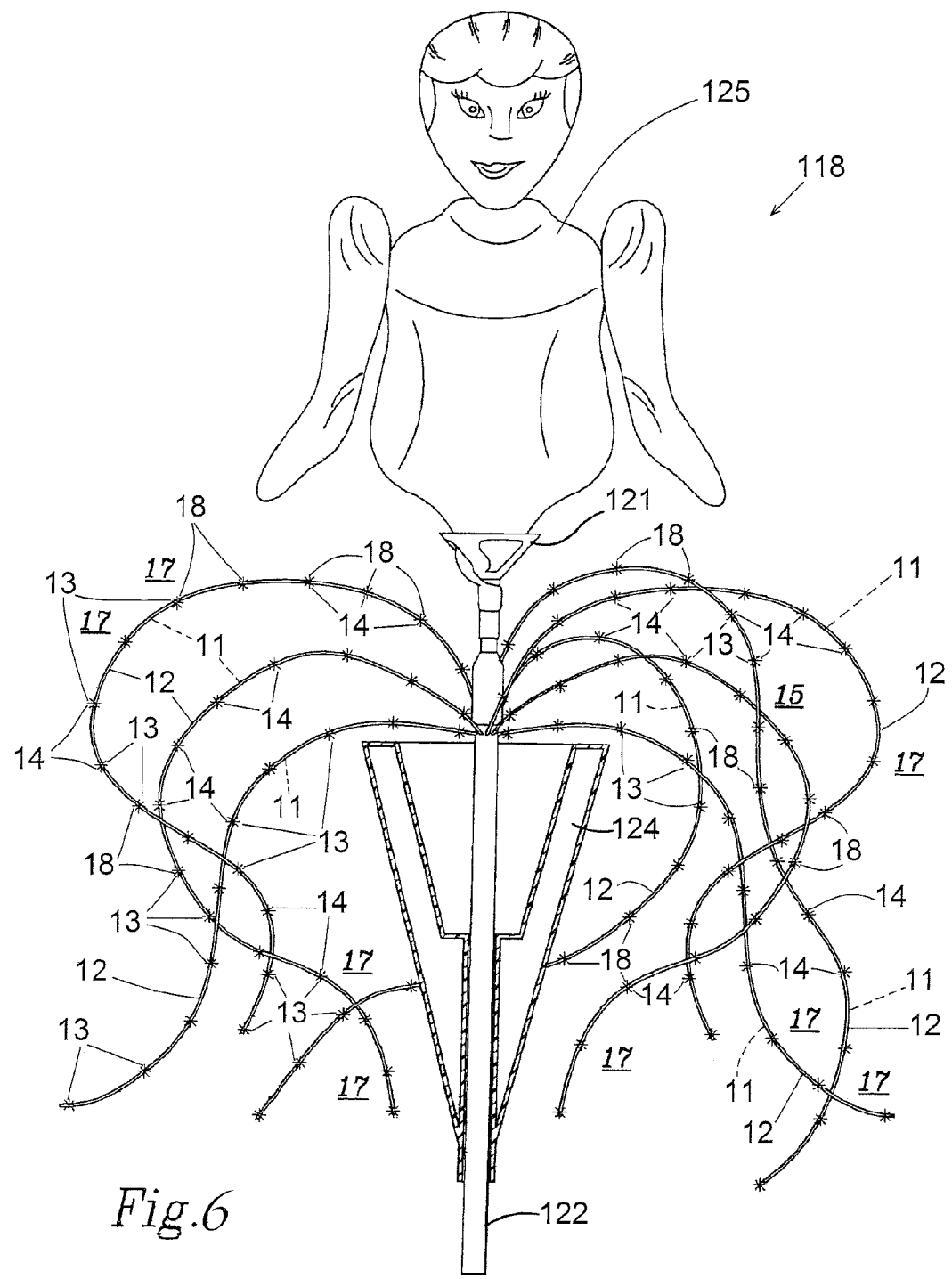
FIG. 6 is a front elevational view, in partial section, of one embodiment of an inventive heavier than air balloon apparatus, which includes an optical fiber light apparatus of the invention.

Turning now to FIG. 6, another embodiment of the inventive balloon apparatus is shown. In FIG. 6, the inventive balloon apparatus is designated with reference number 118. Balloon apparatus 118 has an "equal to air" or "heavier than air" balloon 125 of well-known type. The balloon 125 may be constructed of Mylar or other material, and may be opaque or translucent, and is preferably filled with air (thereby becoming an "equal to air" balloon), or nitrogen or any suitable heavier than air gas of well known type (thereby becoming a "heavier than air" balloon). The example balloon 125 is a Figurine available from any number of sources.

The balloon 125 is supported by a bracket 121 connected to a hollow tube 122, which can be of synthetic plastic or metal as desired. The tube 122 has a cone 124 therearound, which grips the tube 122.

A plurality of lengths of optical fiber 11 of well known type are provided, which are available from a wide variety of sources. In this embodiment, the lengths of optical fiber 11 preferably have an outer protective jacket or cladding 12, along their lengths to prevent light from being transmitted to other than the end of the fiber length, and as illustrated extend out and down from the balloon 125.

The jacket or cladding 12 allows only minimal escape of the light transmitted therein.

Portions of the jacket or cladding 12 are removed at selected locations 14 along the lengths of the optical fiber 11 to create openings 18 in the outer jacket or cladding 12 to permit light to be emitted therefrom. (Alternatively, rather than removing portions of the outer jacket or cladding 12 at selected locations 14 along its length to create openings 18 that act as "light leaks" from the fiber 11 to permit light to be emitted therefrom, cladding 12 may be applied to the fiber 11 except at selected locations 14 along the fiber 11, such that black light is prevented from escaping from the fiber 11 where the cladding 12 is applied to the fiber 11, and such that black light may escape from the fiber 11 where cladding 12 is not applied. The locations 14 along the fiber 11 where the cladding 12 is not applied act as openings 18 from which black light may be emitted from the fiber 11 past the cladding 12.) The openings 18 may be configured to provide a variety of patterns 17, such as stars, circles, squares or any other desired pattern (not shown). As with the embodiments shown in FIGS. 1-5 above, a transparent or translucent coating 13 of at least one fluorescent color is applied to the optical fiber 11 at the openings 18 (at the "light leaks") in the outer jacket or cladding 12. The lengths of optical fiber 11 may be carried in the hollow tube 122 and connected to a UV (ultra-violet) light source (not shown) which shines light into the ends of the optical fiber 11, with the emission of colored fluorescent light from the "light leaks" in the desired light patterns 17 emanating therefrom providing a decorative array below balloon 125. Also, the optical fiber 11 may be etched or abraided at the openings 18 and covered with the transparent or translucent coating 13 of at least one fluorescent color to provide colored fluorescent light from the openings 18 in patterns determined by the etching or abrasions made on the optical fiber 11.

Figure 7:
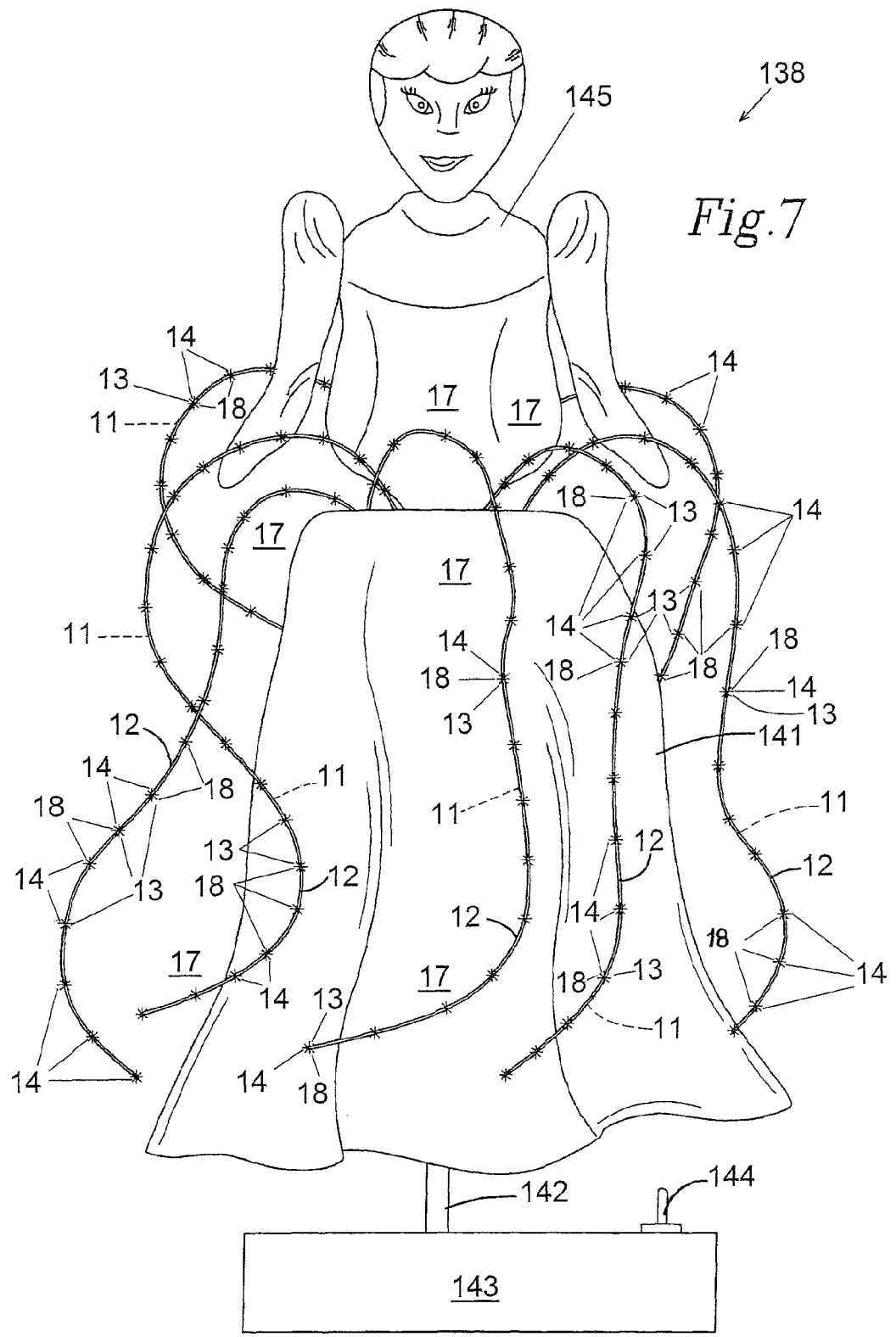
FIG. 7 is a front elevational view of another embodiment of the inventive heavier than air balloon apparatus, which includes an embodiment of an optical fiber light apparatus of the invention.

Referring now to FIG. 7, another embodiment of the inventive balloon apparatus is shown. In FIG. 7, the inventive balloon apparatus is designated with reference number 138. Balloon apparatus 138 has a balloon 145, which is similar to balloon 125.

The balloon 145 has a skirt 141 connected thereto, which skirt 141 is of the flowing swing type. The balloon 145 is connected to a hollow tube 142 inside skirt 141, which tube 142 is connected to a base 143.

The base 143 contains a UV (ultra-violet) light source (not shown) and an on-off switch 144. The base 143 has a plurality of lengths of optical fiber 11 therein connected to the UV (ultra-violet) light source (not shown) which extend upwardly in the tube 142, out and then extend upwardly and outwardly over the exterior of skirt 141 and then downwardly. The lengths of optical fiber 11 preferably have outer protective jackets or cladding 12 along their lengths, with portions removed at selected locations 14 along the lengths of the optical fiber 11 to create openings 18 in the outer jacket or cladding 12 to permit light to be emitted therefrom. (Alternatively, rather than removing portions of the outer jacket or cladding 12 at selected locations 14 along its length to create openings 18 that act as "light leaks" from the fiber 11 to permit light to be emitted therefrom, cladding 12 may be applied to the fiber 11 except at selected locations 14 along the fiber 11, such that black light is prevented from escaping from the fiber 11 where the cladding 12 is applied to the fiber 11, and such that black light may escape from the fiber 11 where cladding 12 is not applied. The locations 14 along the fiber 11 where the cladding 12 is not applied act as openings 18 from which black light may be emitted from the fiber 11 past the cladding 12.) The openings 18 may be configured to provide patterns 17 of light emitted from the openings 18 as desired, to form a decorative array. As with the embodiments shown in FIGS. 1-6 above, a transparent or translucent coating 13 of at least one fluorescent color is applied to the optical fiber 11 at the openings 18 (at the "light leaks") in the outer jacket or cladding 12, such that colored fluorescent light is emitted from the "light leaks" in the desired light patterns 17. Also, the optical fiber 11 may be etched or abraided at the openings 18 and covered with the transparent or translucent coating 13 of at least one fluorescent color to provide colored fluorescent light from the openings 18 in patterns determined by the etching or abrasions made on the optical fiber 11.

Figure 8:
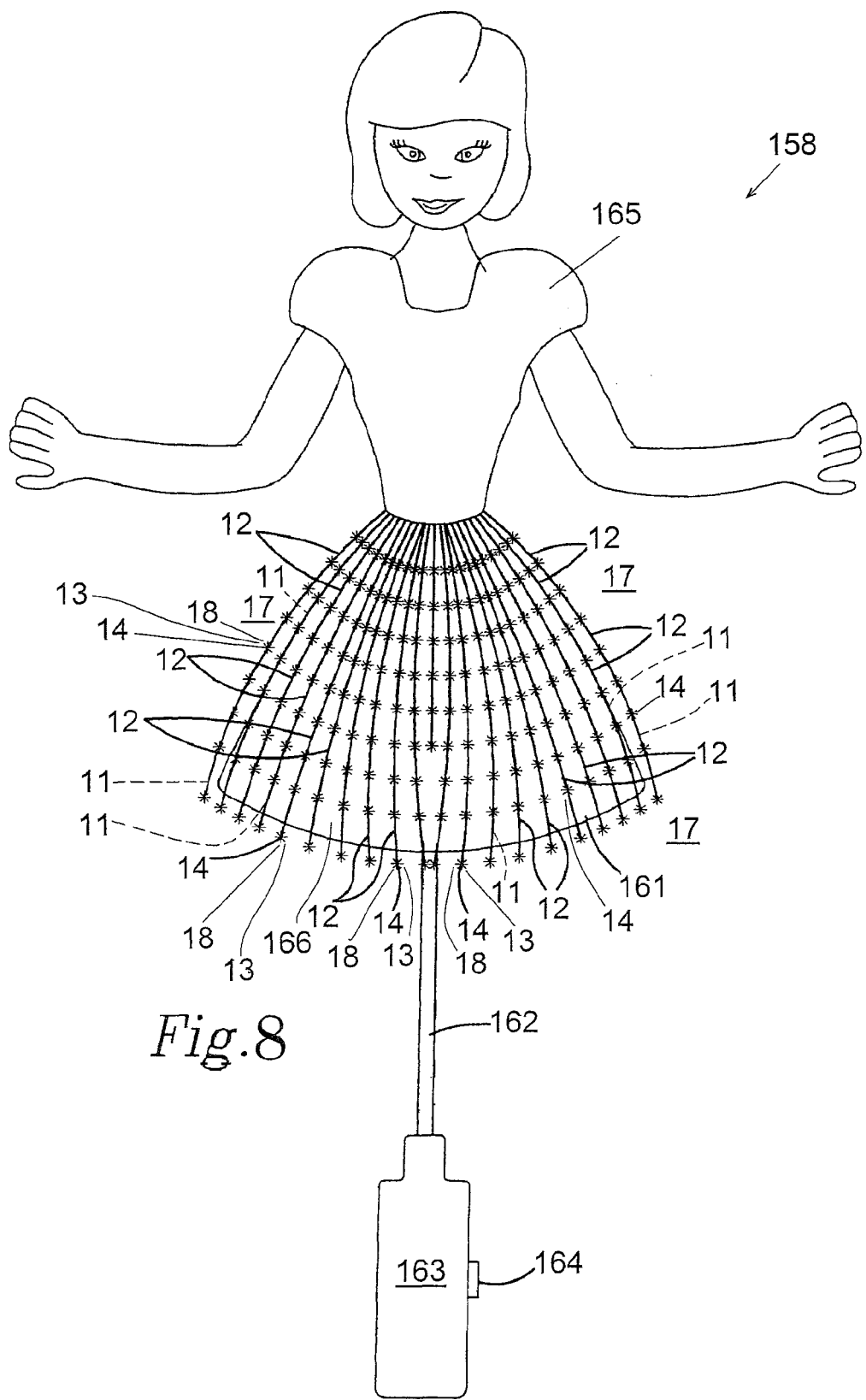
FIG. 8 is a front elevational view of another embodiment of the inventive heavier than air balloon apparatus, which includes an embodiment of the inventive optical fiber light apparatus incorporated into a skirt, which is below the balloon of the inventive balloon apparatus.

Referring now to FIG. 8 another embodiment of the inventive balloon apparatus is shown. In FIG. 8, the inventive balloon apparatus is designated with reference number 158. Balloon apparatus 158 includes a balloon 165, similar to balloon 125. The balloon 165 has a skirt 161 connected thereto. The balloon 165 is connected to a hollow tube 162, inside skirt 161, which tube 162 is connected to a base 163, that contains a UV (ultra-violet) light source (not shown) and an on-off switch 164. The base 163 has a plurality of lengths of optical fiber 11 therein connected to the UV (ultra-violet) light source (not shown), which extend upwardly in the tube 162, out from the tube 162, and then extend downwardly being incorporated into and being an integral part of the exterior 166 of the skirt 161. The lengths of optical fiber 11 preferably have outer light protective jackets or cladding 12 along their lengths, with portions removed at selected locations 14 to create openings in the outer jackets or cladding 12 to permit lighting to be emitted therefrom. (Alternatively, rather than removing portions of the outer jacket or cladding 12 at selected locations 14 along its length to create openings 18 that act as "light leaks" from the fiber 11 to permit light to be emitted therefrom, cladding 12 may be applied to the fiber 11 except at selected locations 14 along the fiber 11, such that black light is prevented from escaping from the fiber 11 where the cladding 12 is applied to the fiber 11, and such that black light may escape from the fiber 11 where cladding 12 is not applied. The locations 14 along the fiber 11 where the cladding 12 is not applied act as openings 18 from which black light may be emitted from the fiber 11 past the cladding 12.) The openings 18 may be configured to provide patterns 17 as desired to form a decorative array of emitted light. As with the embodiments of FIGS. 1-7 above, a transparent or translucent coating 13 of at least one fluorescent color is applied to the optical fiber 11 at the openings 18 (at the "light leaks") in the outer jacket or cladding 12, such that UV (ultra-violet) light (black light) shown into the optical fibers 11 from the UV (ultra-violet) light source results in colored fluorescent light being emitted from the "light leaks" in the desired light patterns. Also, the optical fiber 11 may be etched or abraided at the openings 18 and covered with the transparent or translucent coating 13 of at least one fluorescent color to provide colored fluorescent light from the openings 18 in patterns determined by the etching or abrasions made on the optical fiber 11.

Figure 9:
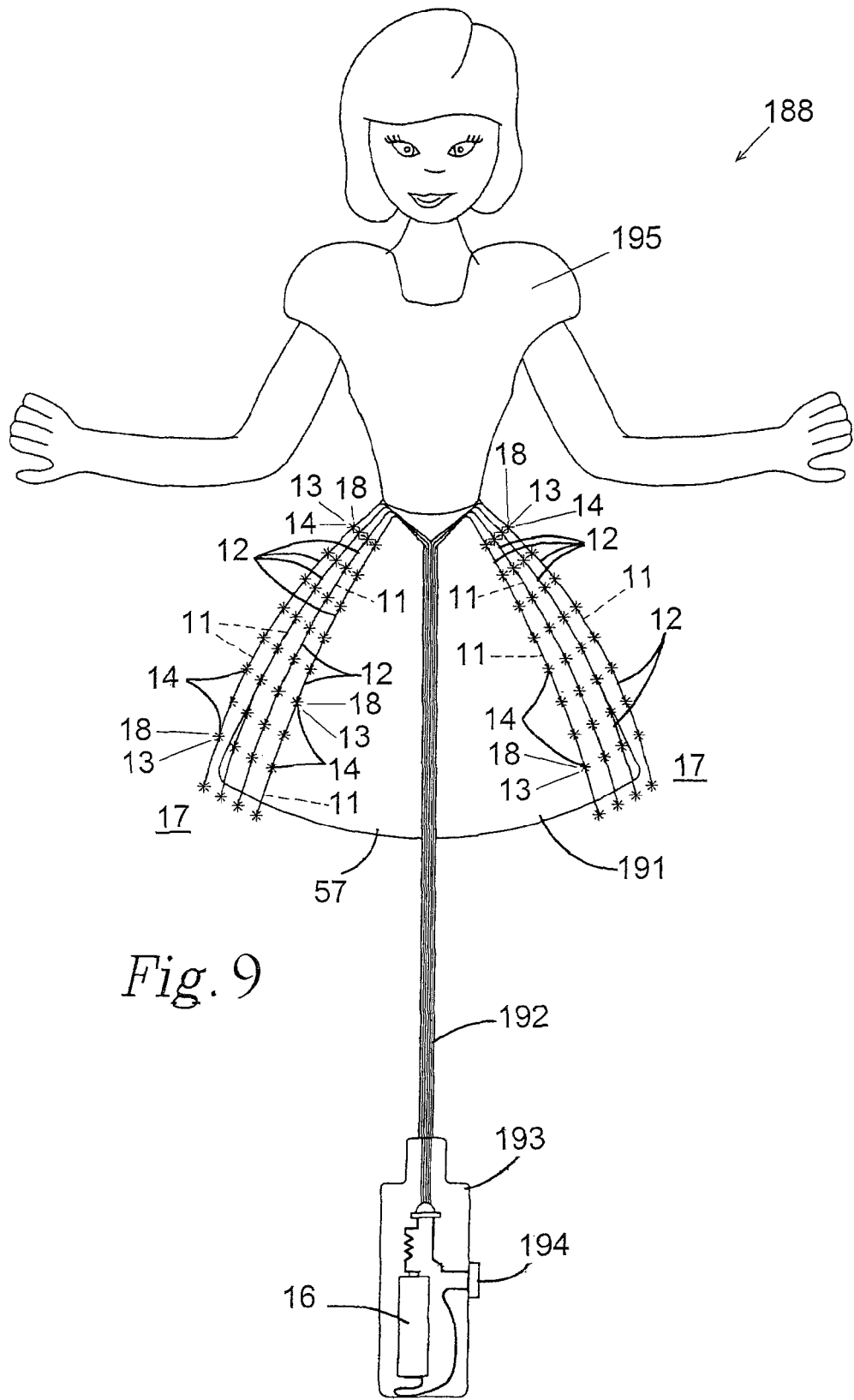
FIG. 9 is a view similar to FIG. 8, in partial section, with an embodiment of the inventive optical fiber light apparatus outside the skirt.

Referring now to FIG. 9, another embodiment of the inventive balloon apparatus is shown. In FIG. 9, the inventive balloon apparatus is designated with reference number 188. Balloon apparatus 188 includes a balloon 195, similar to balloon 125. The balloon 195 has a skirt 191 connected thereto in a similar fashion as skirt 161 to balloon 165.

The balloon 195 is connected to a hollow tube 192 inside skirt 191, which tube 192 is connected to a base 193 that contains a UV (ultra-violet) light source 16, and an on-off switch 194. The base 193 has a plurality of lengths of optical fiber 11 therein connected to the UV (ultra-violet) light source 16. The lengths of optical fiber 11 extend upwardly in the tube 192, out, and then they extend outwardly and downwardly over the exterior of the skirt 191. The lengths of optical fiber 11 have outer light protective jackets or cladding 12 along their lengths, with portions removed at selected locations 14 to create openings 18 in the outer jacket or cladding 12 to permit light to be emitted therefrom to provide patterns 17 as desired to form a decorative array of emitted colored fluorescent light. (Alternatively, rather than removing portions of the outer jacket or cladding 12 at selected locations 14 along its length to create openings 18 that act as "light leaks" from the fiber 11 to permit light to be emitted therefrom, cladding 12 may be applied to the fiber 11 except at selected locations 14 along the fiber 11, such that black light is prevented from escaping from the fiber 11 where the cladding 12 is applied to the fiber 11, and such that black light may escape from the fiber 11 where cladding 12 is not applied. The locations 14 along the fiber 11 where the cladding 12 is not applied act as openings 18 from which black light may be emitted from the fiber 11 past the cladding 12.) As with the embodiments of FIGS. 1-8 above, a transparent or translucent coating 13 of at least one fluorescent color is applied to the optical fiber 11 at the openings 18 (at the "light leaks") in the outer jacket or cladding 12, such that UV (ultra-violet) light (black light) shown into the optical fibers 11 from the UV (ultra-violet) light source 16 result in colored fluorescent light being emitted from the "light leaks" in the desired light patterns 17. Also, the optical fiber 11 may be etched or abraided at the openings 18 and covered with the transparent or translucent coating 13 of at least one fluorescent color to provide colored fluorescent light from the openings 18 in patterns determined by the etching or abrasions made on the optical fiber 11.

Figure 10:
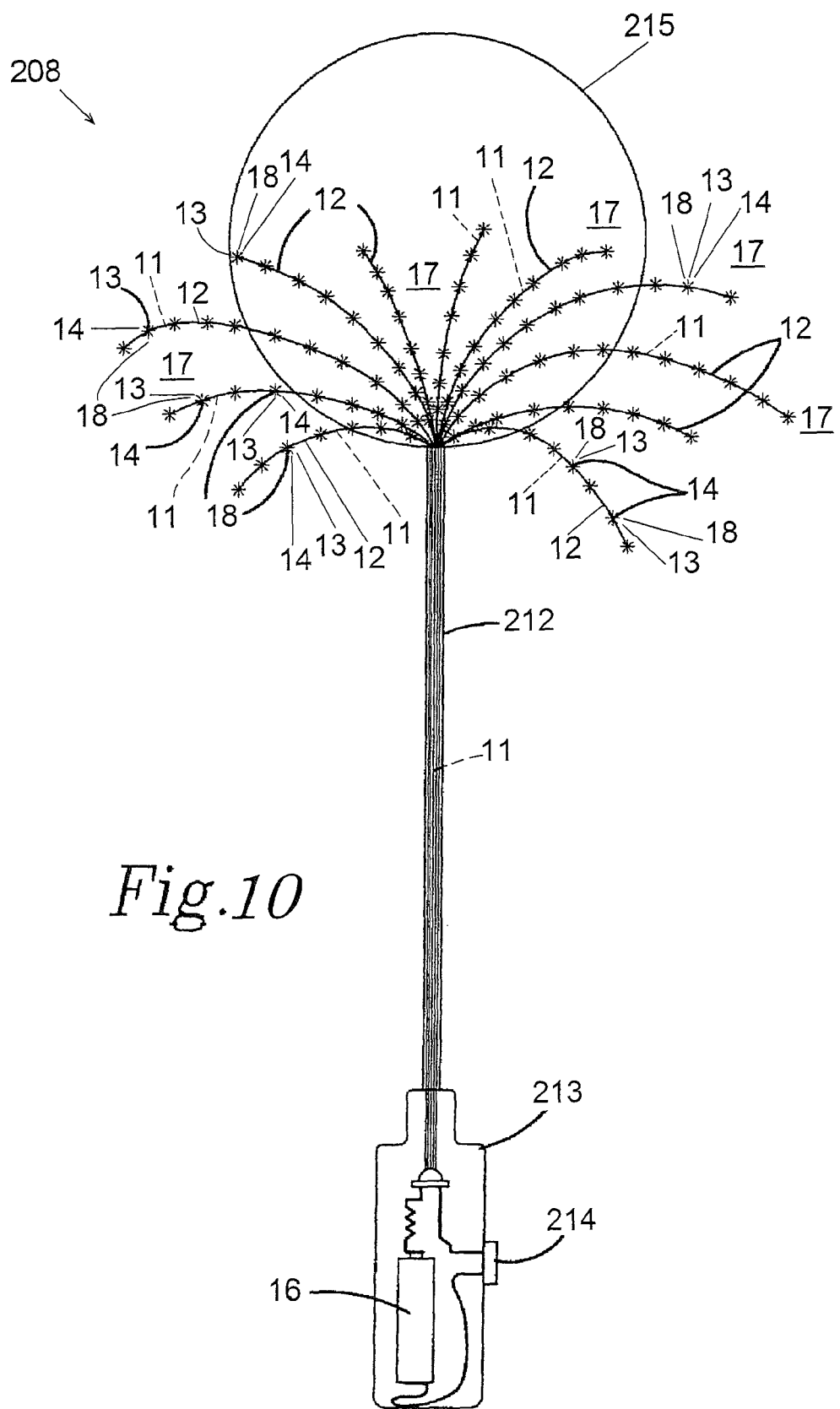
FIG. 10 is a front elevational view, in partial section, of another embodiment of the inventive heavier than air balloon apparatus, which includes an embodiment of the optical fiber light apparatus of the invention.

Turning now to FIG. 10, there is shown another embodiment of the inventive balloon apparatus. In FIG. 10, the inventive balloon apparatus is designated with reference number 208. Balloon apparatus 208 has a balloon 215, which is similar to balloon 125. The balloon 215 is connected to a hollow tube 212 which is connected to a base 213. The base 213 contains a UV (ultra-violet) light source 16, and an on-off switch 214. The base 213 has a plurality of lengths of optical fiber 11 therein connected to the UV (ultra-violet) light source 16, which extend upwardly in the tube 212, out from the tube 212, and then extend outwardly and downwardly. The lengths of optical fiber 11 have outer light protective jackets or cladding 12 along their lengths with portions removed at selected locations 14 along the lengths of the optical fiber 11 to create openings 18 in the outer jacket or cladding 12 to permit light to be emitted therefrom. (Alternatively, rather than removing portions of the outer jacket or cladding 12 at selected locations 14 along its length to create openings 18 that act as "light leaks" from the fiber 11 to permit light to be emitted therefrom, cladding 12 may be applied to the fiber 11 except at selected locations 14 along the fiber 11, such that black light is prevented from escaping from the fiber 11 where the cladding 12 is applied to the fiber 11, and such that black light may escape from the fiber 11 where cladding 12 is not applied. The locations 14 along the fiber 11 where the cladding 12 is not applied act as openings 18 from which black light may be emitted from the fiber 11 past the cladding 12.) The openings 18 may be configured to provide patterns 17 of light emitted from the openings 18 as desired, to form a decorative array. As with the embodiment shown in FIGS. 1-9 above, a transparent or translucent coating 13 of at least one fluorescent color is applied to the optical fiber 11 at the openings 18 (at the "light leaks") in the outer jacket or cladding 12, such that colored fluorescent light is emitted from the "light leaks" in the desired light patterns 17. Also, the optical fiber 11 may be etched or abraided at the openings 18 and covered with the transparent or translucent coating 13 of at least one fluorescent color to provide colored fluorescent light from the openings 18 in patterns determined by the etching or abrasions made on the optical fiber 11. The base 213 may be fitted with a stake (not shown) which may be driven into the ground as required.

Figure 11:
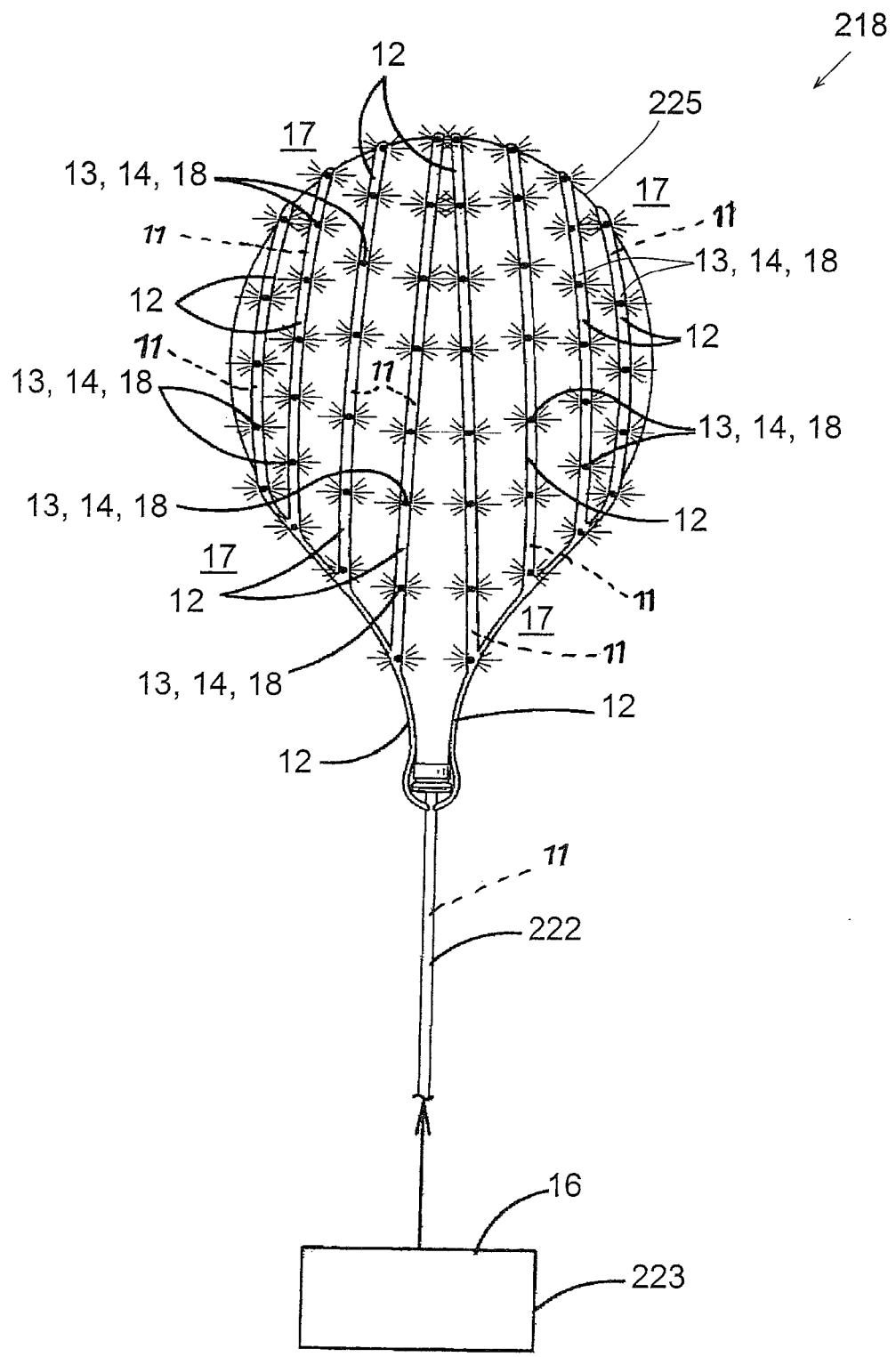
FIG. 11 is a front elevational view in partial section of another embodiment of the inventive heavier than air balloon apparatus, which includes an embodiment of the optical fiber light apparatus of the invention.

Referring now to FIG. 11, there is shown another embodiment of the inventive balloon apparatus, which in FIG. 11 is designated with the reference number 218. Balloon apparatus 218 has a balloon on 225, which is similar to balloon 125. The balloon 225 is connected to a hollow tube 222, which is connected to a base 223. The base 223 contains a UV (ultra-violet) light source 16, and an on-off switch (not shown). The base 223 has a plurality of lengths of optical fiber 11 therein connected to the UV (ultra-violet) light source 16. The lengths of optical fibers 11 extend upwardly in the tube 222, out from the tube 222, and then outwardly and over the balloon 225. The lengths of optical fiber 11 have outer light protective jackets or cladding 12 along their lengths with portions removed at selected locations 14 along the lengths of the optical fiber 11 to create openings 18 in the outer jacket or cladding 12 to permit light to be emitted therefrom. (Alternatively, rather than removing portions of the outer jacket or cladding 12 at selected locations 14 along its length to create openings 18 that act as "light leaks" from the fiber 11 to permit light to be emitted therefrom, cladding 12 may be applied to the fiber 11 except at selected locations 14 along the fiber 11, such that black light is prevented from escaping from the fiber 11 where the cladding 12 is applied to the fiber 11, and such that black light may escape from the fiber 11 where cladding 12 is not applied. The locations 14 along the fiber 11 where the cladding 12 is not applied act as openings 18 from which black light may be emitted from the fiber 11 past the cladding 12.) The openings 18 may be configured to provide patterns 17 of light emitted from the openings 18 as desired, to form a decorative array. As with the embodiments shown in FIGS. 1-10 above, a transparent or translucent coating 13 of at least one fluorescent color is applied to the optical fiber 11 at the openings 18 (at the "light leaks") in the outer jacket or cladding 12, such that colored fluorescent light is emitted from the "light leaks" in the light patterns 17. Also, the optical fiber 11 may be etched or abraided at the openings 18 and covered with the transparent or translucent coating 13 of at least one fluorescent color to provide colored fluorescent light from the openings 18 in patterns determined by the etching or abrasions made on the optical fiber 11.

While the tube supporting the heavier than air balloons described above are hollow, if desired a solid stick or rod (not shown) may be substituted therefor with the lengths of optical fiber 11 extending outside the solid rod or stick.

Figure 12:
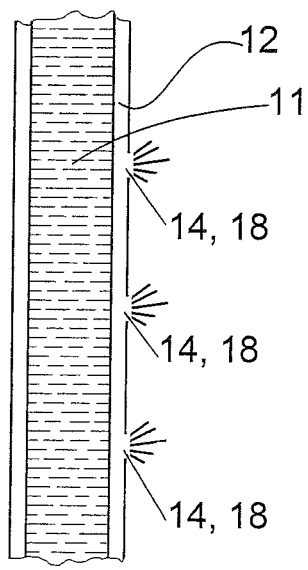
FIG. 12 is a partial view in cross-section of an optical fiber light apparatus, constructed in accordance with the invention.
Figure 13:
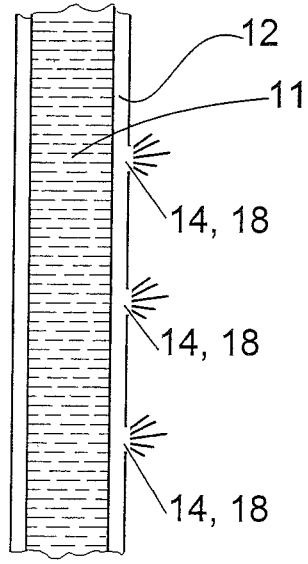
FIG. 13 is a partial view in cross-section of another embodiment of the optical fiber light apparatus, constructed in accordance with the invention.
Figure 14:
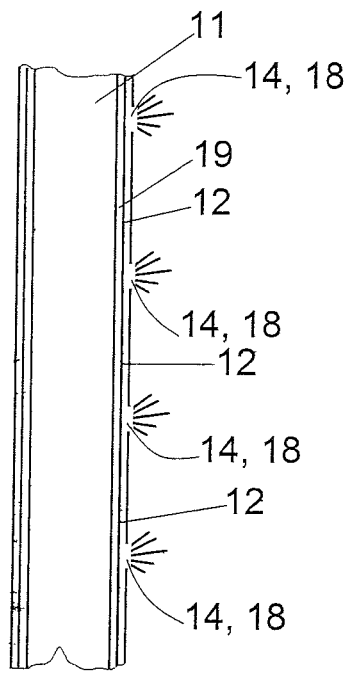
FIG. 14 is a partial view of another embodiment of the optical fiber light apparatus, constructed in accordance with the invention.

Alternatively, rather than applying a coating 13 of at least one fluorescent color to the fiber 11 at the openings 18 (at the "light leaks") in the jacket or cladding 12 (or at the openings 18 (at the "light leaks") between portions of cladding 12 applied to the fiber 11), the fibers 11 may be colored with at least one fluorescent color by solution dyeing (also called dope dyeing or spun dyeing), which involves mixing fluorescent coloring agents into the molten polymer from which the optical fiber 11 is extruded, as part of the extrusion process for producing fiber 11. The resulting optical fiber 11 thus produced has fluorescent color completely dispersed therein, as shown in FIG. 12. Examples of the fluorescent coloring agents include pigment or dyestuff color concentrates in liquid, powder, or pellet form added to the molten polymer from which the optical fiber 11 is extruded. Alternatively, the polymer used to extrude the optical fiber 11 may already be compounded in the final fluorescent color. For example, if the optical fiber 11 is extruded from a thermoplastic, then the base material (usually pellets, beads, or flakes) may be purchased with the fluorescent color or colors already blended therein to the final color or colors desired. Alternatively, rather than coloring the optical fiber 11 via solution dyeing by mixing fluorescent coloring agents into the molten polymer from which the optical fiber 11 is extruded as set out above, the optical fiber 11 may be colored by dyeing the optical fiber 11 with fluorescent dyes after the extrusion process in much the same way yarn is dyed prior to weaving or knitting into fabric. This technique is accomplished by skein dyeing or package dyeing skeins, cones, or spools of the optical fiber 11 after the extrusion process (but prior to the application of the outer jacket or cladding 12 to the optical fiber 11, if such an outer jacket or cladding 12 is applied). Examples of the dyes used to color the optical fiber 11 after the extrusion process include fluorescent color acid dyes, fluorescent color basic dyes, fluorescent color disperse dyes, etc. that penetrate and chemically bind to the core (e.g., acrylic core) of the optical fiber 11, resulting in optical fiber 11 having a fluorescent color extending across the optical fiber 11, as shown in FIG. 13. Also, alternatively, the optical fiber 11 may be coated with a transparent or translucent coating 19 of at least one fluorescent color, as shown in FIG. 14. Examples of such fluorescent color coatings 19 include inks, paints, dyestuffs (applied by sublimation printing), or other colorants applied to the surface of the optical fiber 11 either as a uniform "flood coat" or in patterns of single or multiple colors. With these alternative embodiments of the invention, if an outer jacket or cladding 12 is provided on the optical fiber 11, fluorescent color illumination is emitted from the openings 18 formed by the removal of portions of the jacket or cladding 12 (or from the openings 18 between portions of cladding 12 applied to the fiber 11) without the need of applying a transparent or translucent coating 13 of at least one fluorescent color to the optical fiber 11 at the openings 18, since the optical fiber 11 in these alternative embodiments of the invention already is provided with at least one fluorescent color via being dyed during the optical fiber extrusion process, or via being dyed after the optical fiber extrusion process, or via being coated with a transparent or translucent coating 19 of at least one fluorescent color preferably over a large portion of the outer surface of the optical fiber 11 (and more preferably over the entire outer surface of the optical fiber 11). With the arrangements of these alternative embodiments of the invention, in addition to the more intense areas of the fluorescent color light emitted from the openings 18 when black light is transmitted through the optical fiber 11, there is some (but less intense) fluorescent color illumination emitted through the cladded areas, that is, the portions of the outer jacket or cladding 12 covering the optical fiber 11. Also, in each of these alternative embodiments of the invention, the optical fiber 11 may be etched or abraded at at least a portion of the optical fiber 11 to provide colored fluorescent light in patterns determined by the etching or abrasions made on the optical fiber 11.

Figure 15:
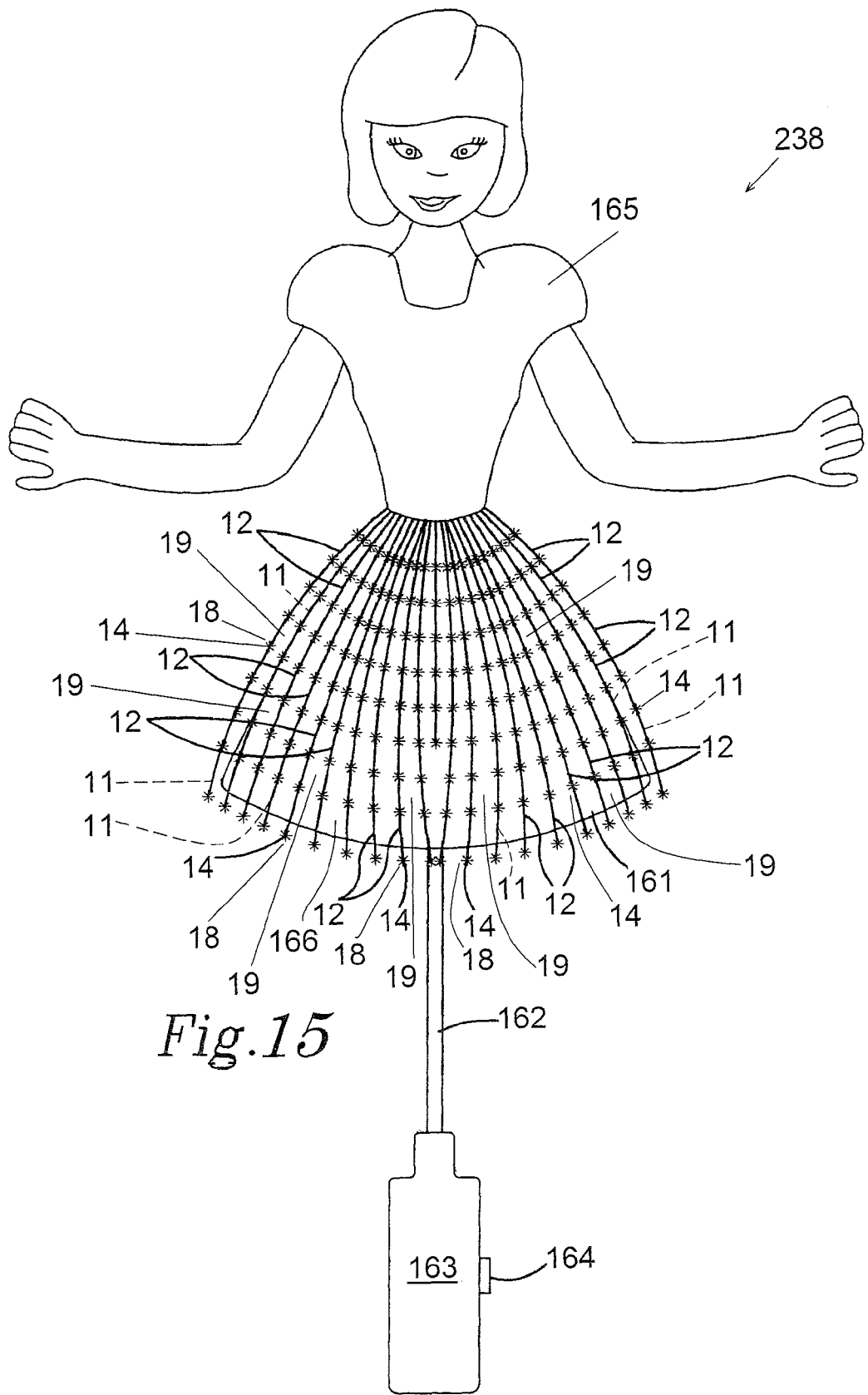
FIG. 15 is a front elevational view of another embodiment of the invention illustrating a targeted UV (ultra-violet) light delivery system for delivering UV (ultra-violet) light to where it is desired to have black light, such as objects having fluorescent colors applied thereto.

The invention also may be used as a targeted UV (ultra-violet) light delivery system for delivering UV (ultra-violet) light to where it is desired to have black light, such as to objects having a fluorescent color or fluorescent colors, such as patterns of fluorescent colors, applied thereto. For example, FIG. 15 illustrates the inventive targeted UV (ultra-violet) light delivery system. FIG. 15 shows a balloon apparatus 238 that includes a balloon 165, similar to balloon 125. The balloon 165 has a skirt 161 connected thereto. The balloon 165 is connected to a hollow tube 162, inside skirt 161, which tube 162 is connected to a base 163, that contains a UV (ultra-violet) light source (not shown) and an on-off switch 164. The base 163 has a plurality of lengths of optical fiber 11 therein connected to the UV (ultra-violet) light source (not shown), which extend upwardly in the tube 162, out from the tube 162, and then extend downwardly being incorporated into and being an integral part of the exterior 166 of the skirt 161. The lengths of optical fiber 11 preferably have outer light protective jackets or cladding 12 along their lengths, with portions removed at selected locations 14 to create openings in the outer jackets or cladding 12 to permit lighting to be emitted therefrom. (Alternatively, rather than removing portions of the outer jacket or cladding 12 at selected locations 14 along its length to create openings 18 that act as "light leaks" from the fiber 11 to permit light to be emitted therefrom, cladding 12 may be applied to the fiber 11 except at selected locations 14 along the fiber 11, such that black light is prevented from escaping from the fiber 11 where the cladding 12 is applied to the fiber 11, and such that black light may escape from the fiber 11 where cladding 12 is not applied. The locations 14 along the fiber 11 where the cladding 12 is not applied act as openings 18 from which black light may be emitted from the fiber 11 past the cladding 12.) A coating 19 of at least one fluorescent color is applied to (e.g., printed onto) the exterior 166 of the skirt 161, and may be applied in a decorative pattern (such as in a star shape, heart shape, or geometric shape) if desired. UV (ultra-violet) light (black light) shown into the optical fibers 11 from the UV (ultra-violet) light source results in black light being emitted from the openings 18 (that is, from the "light leaks" 18) to illuminate the fluorescent color coating 19 applied to the skirt 161 and located in close proximity to the openings 18.

Figure 16:
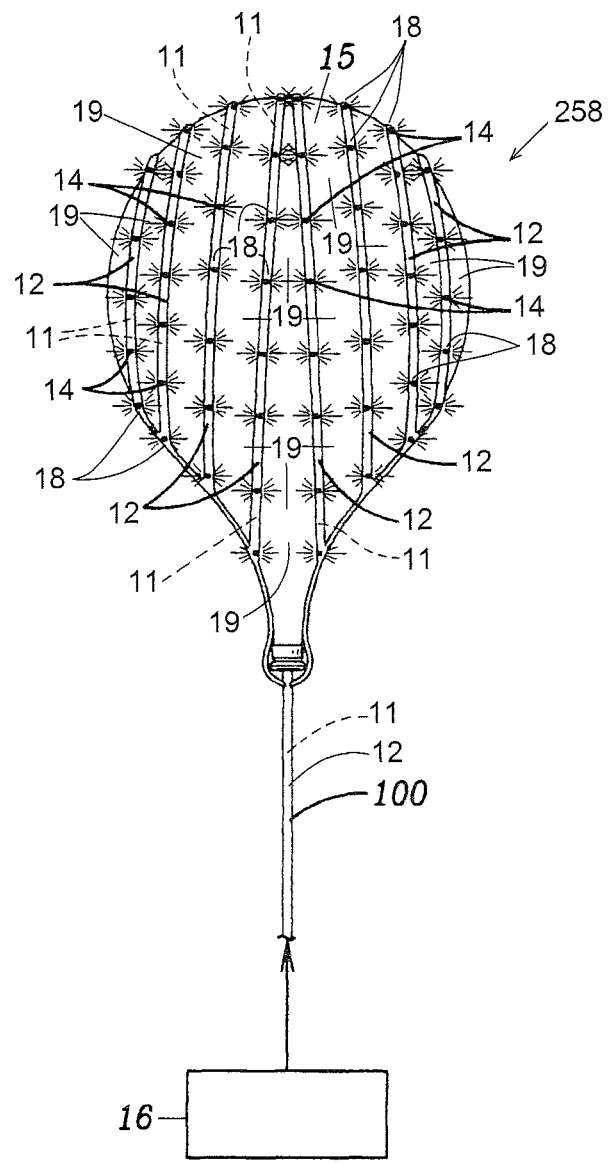
FIG. 16 is a side elevational view of another embodiment of the invention illustrating a targeted UV (ultra-violet) light delivery system for delivering UV (ultra-violet) light to where it is desired to have black light, such as objects having fluorescent colors applied thereto.

Another example of the inventive targeted UV (ultra-violet) light delivery system is illustrated in FIG. 16, which shows a balloon apparatus 258 which has a balloon 15, with a tether 100, which includes a plurality of lengths of optical fibers 11, having outer jackets or cladding 12, which allow only minimal light to escape, with portions removed at selected locations 14 along their lengths to create openings 18 in the outer jacket or cladding 12, to provide light patterns 17 to be emitted therefrom at selected locations 14. (Alternatively, rather than removing portions of the outer jacket or cladding 12 at selected locations 14 along its length to create openings 18 that act as "light leaks" from the fiber 11 to permit light to be emitted therefrom, cladding 12 may be applied to the fiber 11 except at selected locations 14 along the fiber 11, such that black light is prevented from escaping from the fiber 11 where the cladding 12 is applied to the fiber 11, and such that black light may escape from the fiber 11 where cladding 12 is not applied. The locations 14 along the fiber 11 where the cladding 12 is not applied act as openings 18 from which black light may be emitted from the fiber 11 past the cladding 12.) The fibers 11 surround and encapsulate the balloon 15. A coating 19 of at least one fluorescent color is applied to (e.g., printed onto) the balloon 15, and may be done so in a decorative pattern (such as in a star shape, heart shape, or geometric shape) if desired, such that UV (ultra-violet) light (black light) from the UV (ultra-violet) light source 16 shown into the optical fibers 11 results in black light being emitted from the openings 18 (that is, from the "light leaks 18") to illuminate the fluorescent color coating 19 applied to the balloon 15 and located in close proximity to the openings 18.

The invention claimed is:

1. A balloon apparatus, comprising
a balloon,
a tether comprising at least one optical fiber,
outer cladding surrounding the at least one optical fiber to prevent black light from escaping from the at least one optical fiber past the outer cladding,
the outer cladding having openings at selected locations along its length to permit black light to be emitted therethrough from the at least one optical fiber,
at least one fluorescent color applied to the at least one optical fiber, and
a UV light source to provide black light to the at least one optical fiber.

2. The balloon apparatus of claim 1,
the outer cladding having portions removed therefrom at selected locations creating the openings in the cladding to permit black light to be emitted therethrough from the at least one optical fiber.

3. The balloon apparatus of claim 1,
the openings in the cladding being configured and shaped to produce a desired pattern of light passing through the openings.

4. The balloon apparatus of claim 3,
the patterns of light being at least one star pattern, at least one circle pattern, at least one square pattern, or combinations thereof.

5. The balloon apparatus of claim 1,
the at least one fluorescent color being a coating of at least one fluorescent color applied to the at least one optical fiber.

6. The balloon apparatus of claim 1,
the at least one fluorescent color being a fluorescent dye applied to the at least one optical fiber by dyeing the at least one optical fiber.

7. The balloon apparatus of claim 1,
the at least one fluorescent color being a coating of at least one fluorescent color applied to the at least one optical fiber at the openings in the cladding.

8. The balloon apparatus of claim 1,
the at least one optical fiber comprising a plurality of optical fibers, the plurality of optical fibers being configured and arranged to surround and encapsulate the balloon.

9. The balloon apparatus of claim 1,
the balloon being a lighter than air balloon.

10. The balloon apparatus of claim 1,
the balloon being an equal to air balloon or a heavier than air balloon.

11. The balloon apparatus of claim 1,
the at least one optical fiber comprising a plurality of optical fibers,
the tether including a hollow tube through which extend portions of the plurality of optical fibers, and
the portions of the plurality of optical fibers extending from the hollow tube forming a decorative array outside of the balloon.

12. The balloon apparatus for claim 11, further including
a skirt extending downwardly from the balloon, the skirt not being an integral portion of the balloon, and
the decorative array formed by the portions of the plurality of optical fibers extending from the hollow tube extending downwardly over the skirt in close proximity to the skirt.

13. The balloon apparatus of claim 1,
the outer cladding being applied to the at least one optical fiber except at selected locations along the optical fiber, wherein black light is prevented from escaping from the at least one optical fiber where the outer cladding is applied, and wherein black light may be emitted at the selected locations along the optical fiber where the outer cladding is not applied.

14. The balloon apparatus of claim 1,
the at least one optical fiber having an etched or abraided portion, and the at least one optical fiber having the at least one fluorescent color applied at the etched or abraided portion.

15. A balloon apparatus, comprising
a balloon,
a tether comprising at least one optical fiber,
outer cladding surrounding the at least one optical fiber to prevent black light from escaping from the at least one optical fiber past the outer cladding, and
an ultra-violet light source to provide black light to the at least one optical fiber,
the cladding having openings extending therethrough at selected locations along its length to permit black light to be emitted through the openings from the at least one optical fiber to deliver black light to fluorescent color located in close proximity to the openings.

16. The balloon apparatus of claim 15, further including
a skirt, the skirt not being an integral part of the balloon, and
fluorescent color applied to the skirt,
the at least one optical fiber being positioned such that the openings in the cladding are located in close proximity to the fluorescent color applied to the skirt.

17. The balloon apparatus of claim 15, further including
fluorescent color applied to the balloon,
the at least one optical fiber being positioned such that the openings in the cladding are is located in close proximity to the fluorescent color applied to the balloon.

* * * * *